Patented Apr. 6, 1954

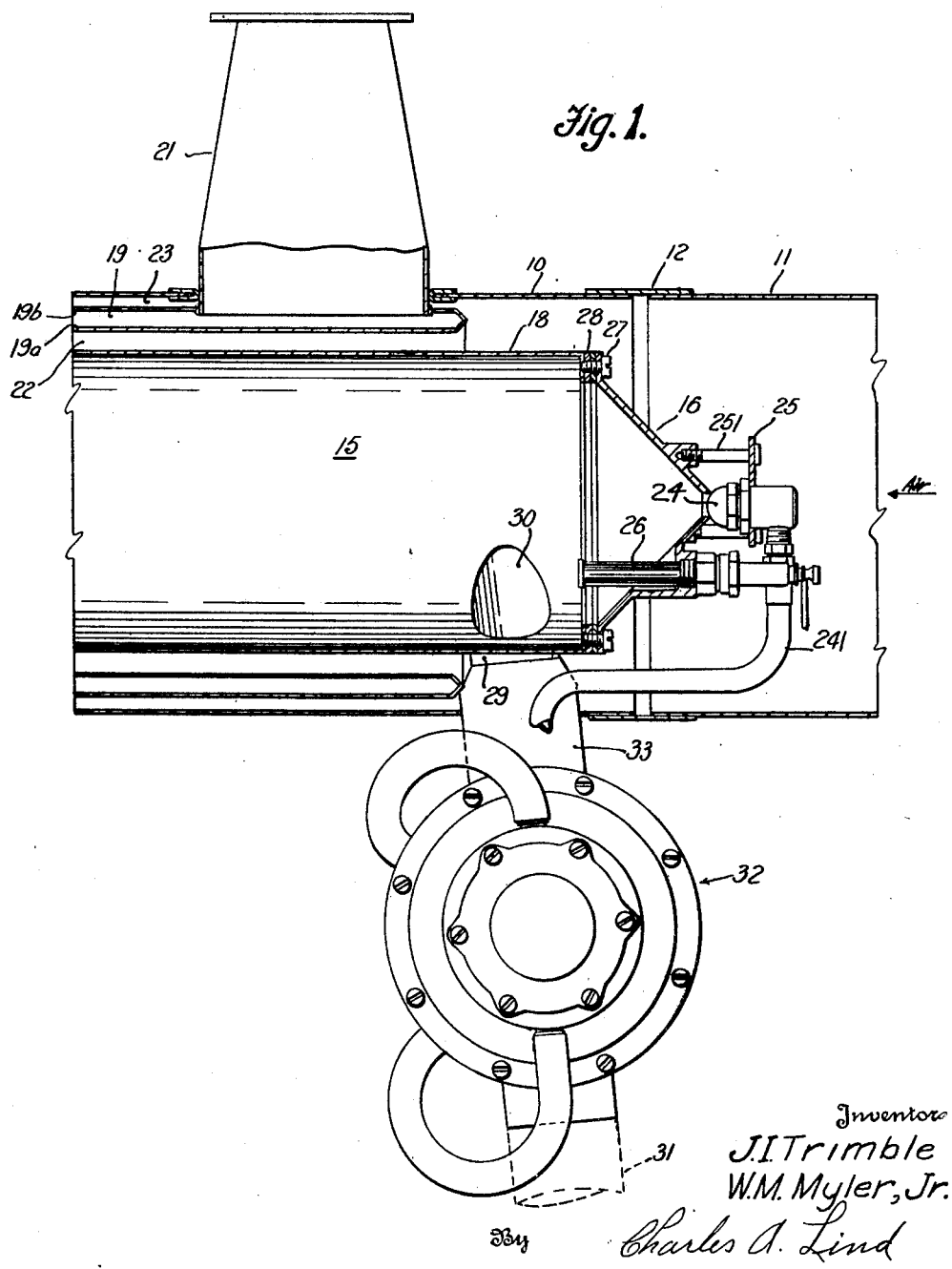

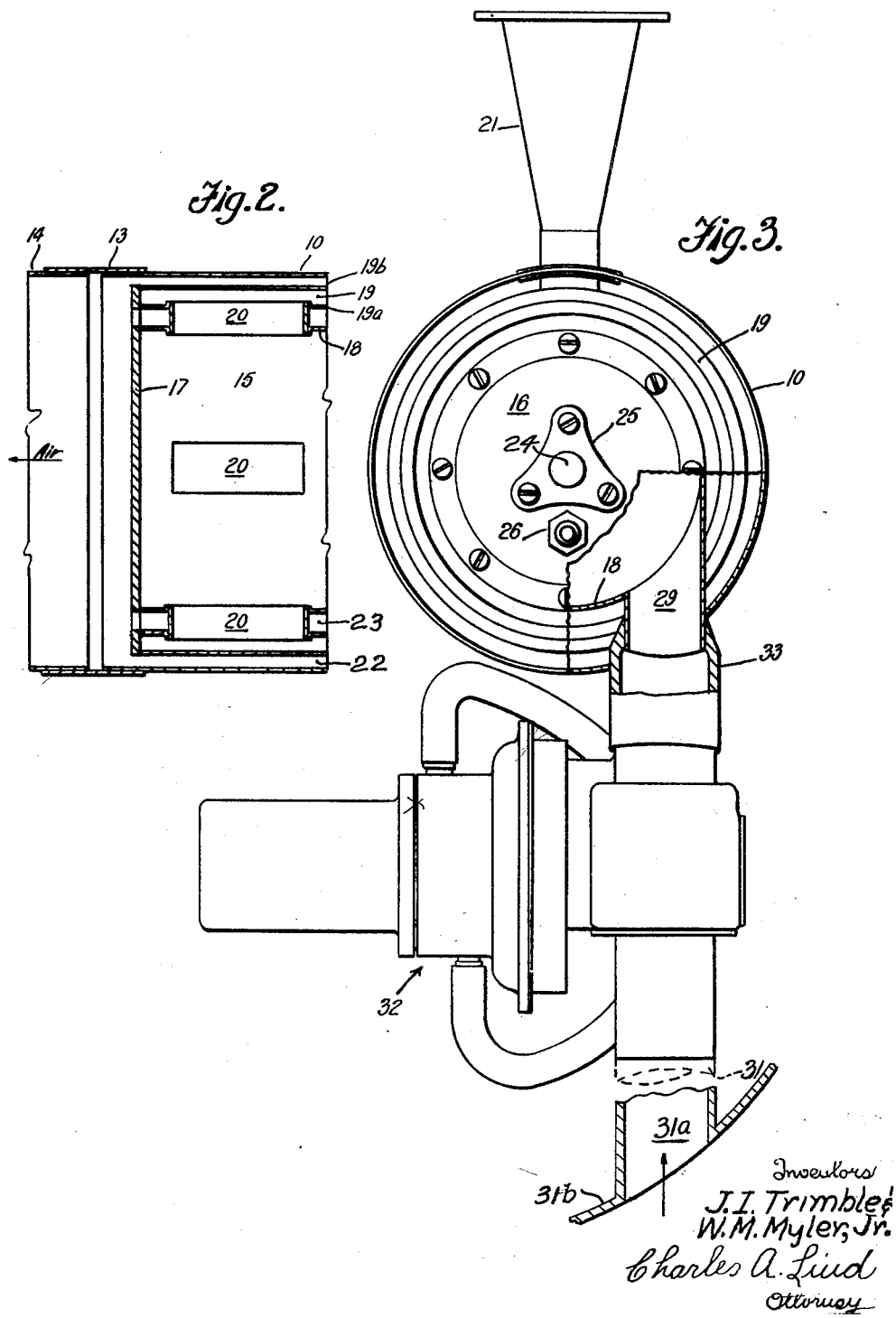

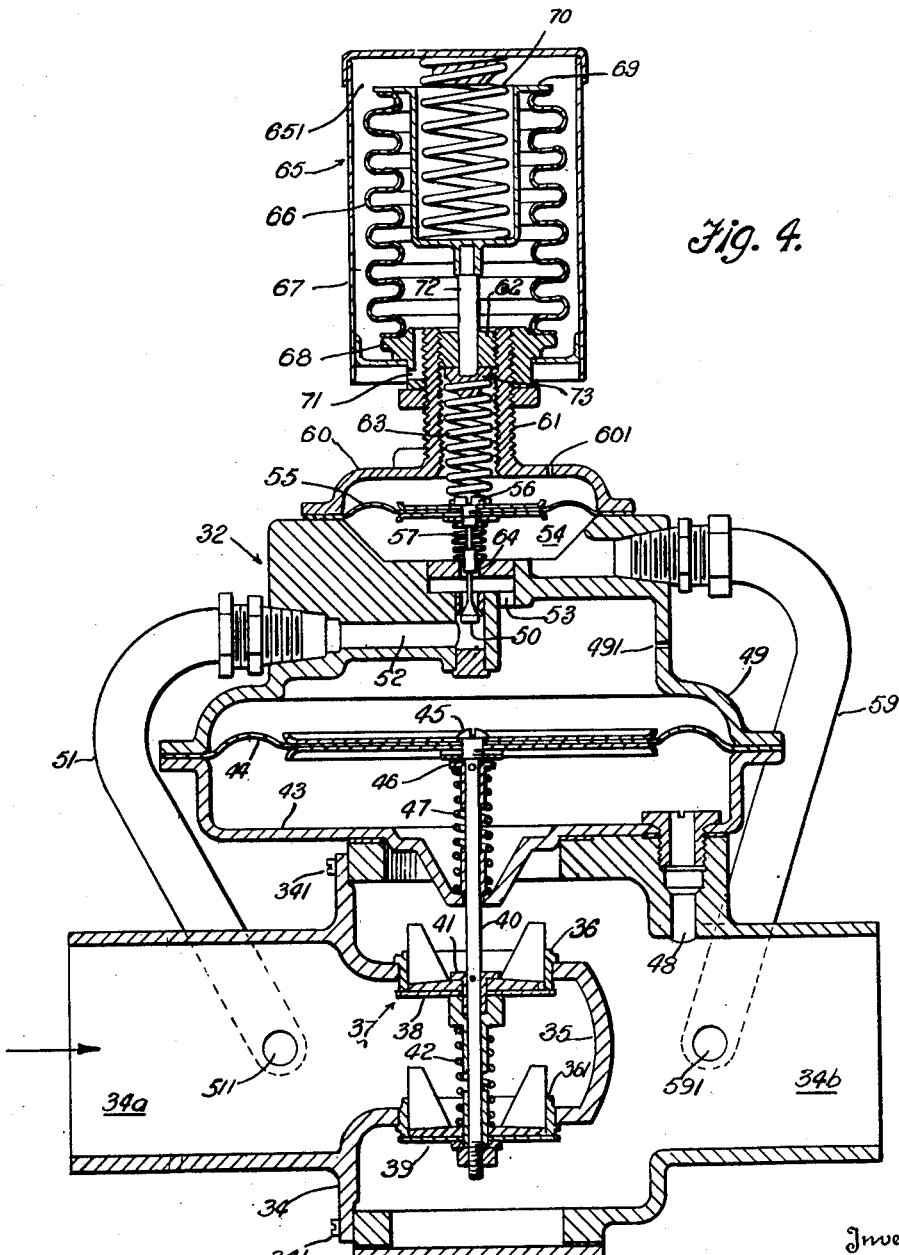

2,674,304

UNITED STATES PATENT OFFICE 2,674,304

AIRCRAFT HEATER AND COMBUSTION AIR CONTROL THEREFOR

John I. Trimble and William M. Myler, Jr., Columbus, Ohio, assignors, by mesne assignments, to Surface Combustion Corporation, Toledo, Ohio, a corporation of Ohio Division of application Serial No. 477,746, March 2, 1943. Continuation of application Serial No. 655,932, March 21, 1946. This application October 30, 1948, Serial No. 57,488

7 Claims. (Cl. 158—28)

This invention relates to a heater for use in aircraft and more particularly to a heater adapted to utilize engine gasoline as fuel and air from a ram for supporting combustion.

The general object of the invention is to provide improvements in means for burning in a closed combustion chamber a liquid fuel with air whose density varies with substantial changes in the altitude of the aircraft, wherein, in order to burn the fuel properly, the ratio between the volume rate at which air is supplied to the combustion chamber and the volume rate at which the liquid fuel is supplied to the combustion chamber is varied with changes in the density of the air, it being understood that for proper combustion a given weight of fuel will always require a given weight of air.

For a consideration of what we consider to be novel and our invention, attention is directed to the following specification and the claims appended thereto.

This application is a division of now abandoned application Serial No. 477,746, filed March 2, 1943, and is a continuation of now abandoned application Serial No. 655,932, filed March 21, 1946.

In the accompanying drawings forming part of this specification—

Figs. 1 and 2 when arranged end to end constitute an axial section of the improved heater with an intermediate portion omitted.

Fig. 3 is an end elevation of Fig. 1 with parts in section.

Fig. 4 is an enlarged sectional view of a detail shown in Fig. 1.

In the present invention the fuel is burned in a cylindrical combustion chamber 15 defined by a tubular shell 18 having end closures 16 and 17. The shell 18 is surrounded by a tubular air casing 10 to one end of which the air to be heated is delivered by a forced air supply duct 11 and from the other end of which the heated air flows into a distributing duct 14. Straps are indicated at 12 and 13 for detachably connecting the casing 10 to the ducts 11 and 14.

The combustion gases are exhausted from the combustion chamber 15 through a circumferential row of exhaust ports 20 adjacent the end closure 17 and thence flow to a waste gas flue 21 through an intermediate hollow annular heat exchanger 19 whose circumferential walls are indicated at 19a and 19b, this heat exchanger being spaced from the tubular shell 18 and from the air casing 10 to provide air passages 22 and 23 for the air to be heated.

In the present invention the fuel (engine gasoline) is made available for burning at the front end of the combustion chamber by a spray nozzle 24 carried by the closure 16 and is heated to its ignition temperature by an electrically heated igniter 26 also carried by the closure 16. The air for supporting combustion of the fuel is a stream of air from an air ram 31, having an inlet 31a which leads from the exterior 31b of the aircraft and is so directed as to scoop air from the air stream flowing past the aircraft, it being understood that the velocity pressure of the ram air will vary with the speed of the aircraft. In the present invention, a stream of air from the air ram enters the combustion chamber through a tangential air inlet 30 whereby the air stream tends to whirl in said chamber, the air being conducted to said inlet by an air duct which includes a tangentially arranged conduit 29 whose outlet is coincident with said inlet 30.

It has been found that when the longitudinal axis of the tangential air inlet 30 is in a plane perpendicular to the axis of the combustion chamber, the spinning air, especially at high speeds of rotation, offers substantial resistance to the incoming air and, therefore, to avoid this difficulty the longitudinal axis of said inlet will ordinarily be arranged at a few degrees angle to said plane in a direction away from the front end of the combustion chamber (see Fig. 1) so that the spinning air in making its first revolution in the chamber 15 will pass more or less to one side of the air inlet 30.

When the fuel supplied to the spray nozzle 24 is leaded gasoline, the lead will tend to deposit out and clog the discharge orifice of the spray nozzle if the tip of the nozzle 24 gets too hot. It is, therefore, important that the tip of the spray nozzle shall be maintained relatively cool and to this end the closure 16 is preferably made cone shape as shown and the nozzle mounted at the apex thereof. To reduce conduction of heat from the closure to the nozzle it is desirable to so mount the nozzle on the closure that there is substantially no more than line contact between them as clearly indicated in Fig. 1. To permit ready removal of the nozzle 24 from its seat on the closure for cleaning, it is held to its seat by a triangular clamping plate 25 through the center of which the outer portion of the nozzle body extends, the plate being secured to the closure by screws 251 which extend into threaded bosses on said closure. If more than one spray nozzle is employed, the outer end of the closure may be flattened so that the nozzles may be arranged in a circular row as will be readily understood. Screws 27 serve to detachably secure the closure 16 to the rim portion 28 of the tubular shell 18.

Fuel is supplied under pressure to the spray nozzle by a supply pipe 241 which leads from a fuel pump (not shown) which may be either the fuel pump which supplies fuel to the aircraft engine or a separately driven fuel pump.

The igniter 26 comprises a ceramic tube adapted to be heated to incandescence by a heating coil inside of the tube. It will be understood that by having the heating coil inside of the tube, the coil will not be chilled by the incoming air to the same degree as if the coil were out in the open. Ordinarily the igniter will be turned on only long enough to start the heater because once the fuel has been ignited, the whirling flame in the combustion chamber 15 will automatically ignite the incoming fuel. A spark plug might be employed in place of an electrically heated igniter but in such case it might be necessary to preheat the fuel to a greater or less degree so that it will readily vaporize on being discharged from the nozzle.

To control the flow of air from the air ram 31 to the combustion chamber 15, a flow control valve 37 (see Fig. 4) is provided in the air supply duct leading from said air ram to the tangential air inlet 30, the position of the valve being automatically controlled by a pressure regulator generally indicated at 32. Although the pressure regulator by itself constitutes no part of the present invention, a preferred type of regulator has been shown in Fig. 4. This regulator comprises a valve housing 34 whose air intake side, indicated at 34a, is connected to the air ram 31, and whose air discharge side, indicated at 34b, is connected by means of a coupling 33 to the tangentially arranged conduit 29. For constructional reasons, the valve housing will ordinarily comprise right and left hand sections held together by screws 341. The partition wall between the inlet and outlet ends of the valve housing is indicated at 35, the same comprising upper and lower wall portions wherein alined bushings 36 and 361 are positioned to form air passages through the partition. A balanced valve 37 comprising upper and lower valves 38 and 39 carried by a valve stem 40 controls the flow of air through the bushings. The manner of securing the valves 38 and 39 to the valve stem is more or less immaterial but in the construction illustrated there is fixedly secured to the stem 40 a flanged sleeve 41 against the flange of which the upper valve 38 is pressed by a light spring 42 interposed between the two valves 38 and 39.

Mounted on the valve housing 34 is a bowl 43 which is spanned by a flexible diaphragm 44 whose central portion is confined in the usual way between metal plates held in place by a central screw or the like 45. The valve stem 40 extends though the bottom of the bowl 43 for engagement with the underside of the diaphragm and at its upper end carries a flanged sleeve 46.

A light spring 47 interposed between the flange of said sleeve and the bottom of the bowl tends to move the valve stem upwardly and thus to hold the valves 38 and 39 to their seats on the bushings 36 and 361. When the diaphragm is forced downwardly it will, of course, depress the valve stem and thus open the valve 37 as will now be readily understood. The outlet side 34b of the valve housing and the space below the diaphragm 44 are in open communication with each other by way of a passage 48 with the result that the air pressure below the diaphragm 44 is substantially the same as that which prevails at 34b.

A cover over the diaphragm 44 is indicated at 49. Except as a control valve 50 may prevent, the space above the diaphragm 44 and the air inlet side 34a of the valve housing 34 are in open communication with each other through a pipe 51 which leads from an opening 511, at the air inlet side 34a of the valve housing 34, to a passage 52 which in turn is connected by the valve 50 to a passage 53 leading into the space above the diaphragm 44. A bleed port 491 leads from the space above the diaphragm 44 to the ambient atmosphere surrounding the regulator. It will be apparent that when the valve 50 is substantially closed, the bleeding of air through the bleed port 491 will cause the pressure in the space above the diaphragm 44 to approach the ambient pressure. On the other hand, it will be apparent that when the valve 50 is wide open the pressure in the space above the diaphragm 44 will approach the ram pressure in the air inlet side 34a of the valve housing 34, because the port 491 is only a bleed port and because, as hereinbefore stated, the air inlet side 34a and the space above the diaphragm 44 are in open communication with each other except as the valve 50 may prevent. Thus the function of the valve 50 is to maintain in the space above the diaphragm 44 a controlled pressure which can be varied between a value approaching the ambient pressure and a value approaching the ram pressure in the air inlet side 34a of the valve housing 34.

The pressure in the outlet side 34b of the valve housing 34 must always be slightly below the pressure in the space above the diaphragm 44, for the following reasons: the total force acting upward on the diaphragm 44 is the force exerted by the air pressure below the diaphragm plus the force exerted by the light spring 47. Because the diaphragm 44 is relatively large, and because the spring 47 is a light spring, the force exerted by the spring 47 is relatively small compared to the force exerted by the air pressure. Thus, if the air pressure above the diaphragm 44 is more than slightly greater than the air pressure below the diaphragm, the diaphragm will move down to open the balanced valve 37 wider and thus increase the pressure in the outlet side 34a until the pressure beneath the diaphragm is only slightly less than the pressure above the diaphragm. On the other hand, if the pressure above the diaphragm 44 should fall, the diaphragm will move upward so as to throttle down the valve 37 and thus reduce the pressure in the outlet side 34b until the pressure beneath the diaphragm is again slightly less than the pressure above the diaphragm. It follows that the system including the valves 37 and 50, by maintaining above the diaphragm 44 a controlled pressure that lies between the ambient pressure and the ram pressure, simultaneously maintains in the outlet side 34b of the valve housing 34 a controlled pressure that is slightly lower than the pressure above the diaphragm 44.

The top side of the cover 49 is formed to provide a bowl 54 which is spanned by a flexible diaphragm 55 whose central portion is confined in the usual way between metal plates held in place by a screw or the like 56. The stem of the valve 50 extends through an opening 64 in the bottom of the bowl 54 and is held by a spring 57 in engagement with said diaphragm. The outlet side 34b of the valve housing 34 and the space below the diaphragm 55 are in open communication with each other through a pipe 59 whose inlet end communicates with an opening 59l in the outlet side 34b of the valve housing 34. A cover 60 over the diaphragm 55 is provided with a vent 60l to maintain the pressure above the diaphragm 55 at the ambient pressure. The cover 60 has an interiorly and exteriorly threaded neck 61. In the upper end of said neck is an adjustable plug 62, and between said plug and the upper side of the diaphragm 55 is a spring 63.

It will be apparent that if the plug 62 is not screwed in far enough to place any compression upon the spring 63, and if the spring 57 is strong enough to counterbalance the weight of the parts, the valve 50 will be unable to open. Then if the plug 62 is screwed down just enough to cause the valve 50 to open slightly, ram air will begin to flow through the pipe 51 into the space above the diaphragm 44. As explained hereinbefore, the air entering the space above the diaphragm 44 will cause the pressure in said space to increase to a value that depends upon the degree to which the valve 50 has been opened, and such increase in pressure will cause the valve 37 to open far enough to bring the pressure below the diaphragm 44 to a value slightly less than the pressure above the diaphragm. Since the space below the diaphragm 44 and the space below the diaphragm 55 are both in open communication with the outlet side 34b of the valve housing 34, the pressure existing below the diaphragm 44 will be communicated to the space below the diaphragm 55. The force exerted by this pressure on the bottom of the diaphragm 55 plus the slight force exerted by the spring 57 will always tend to equal the force exerted by the spring 63 plus the weight of the parts and the force exerted by the ambient pressure on the top of the diaphragm 55.

Since the spring 63 is relatively long, the slight movement of the diaphragm 55 and the valve 50 that is necessary to produce a large change in the pressure above the diaphragm 44 causes only a negligible change in the force exerted by the spring 63. Thus so long as the upper end of the spring 63 remains stationary, the spring 63 exerts a substantially constant force against the top of the diaphragm 55 during the operation of the device and the differential between the pressure beneath the diaphragm 55 and the ambient pressure is maintained substantially constant. Any increase in such pressure differential would be counteracted by upward movement of the diaphragm 55 which would partially close the valve 50 and reduce the pressure above the diaphragm 44, thus tending to reduce the pressure below the diaphragms 44 and 55, which must always remain slightly less than the pressure above the diaphragm 44. On the other hand, any reduction in the pressure differential across the diaphragm 55 would be counteracted by downward movement of the diaphragm which would open the valve 50 wider, thus tending to increase the pressure above the diaphragm 44 and thereby tending to increase the pressure below the diaphragms 44 and 55. The spring 63 provides a delicate control over the pressure differential between the ambient pressure and the pressure below the diaphragm 55, because the diaphragm 55 will always position the valve 50 so as to maintain such pressure differential at a value determined by the force exerted by the spring 63.

The amount of the pressure differential between the ambient pressure and the pressure below the diaphragm 55 can be adjusted by adjusting the plug 62 so as to adjust the force exerted by the spring 63 against the top of the diaphragm 55. Since the total force exerted against the bottom of the diaphragm 55 must always tend to equal the total force acting downward on the diaphragm, any adjustment in the force exerted by the spring 63 will cause the valve 50 to move to a new position so as to produce a change in the pressure beneath the diaphragm corresponding to the change in the force exerted by the spring 63. Thus the device maintains a pressure differential between the ambient pressure and the pressure below the diaphragm 55 that corresponds at all times to the force exerted by the spring 63.

Although the distance through which the valve 50 moves between substantially closed position and wide open position is relatively small and the volume of air flowing through the valve is always relatively small, the large diaphragm 44 is freely movable through a relatively great distance and provides ample power to control the large volume of air flowing through the balanced valve 37 by moving the valve to such a position that the pressure on the outlet side 34b of the valve is always slightly less than the pressure above the diaphragm 44.

In order to permit the pressure at 34b to be controlled throughout the desired range, the ram air pressure at 34a must always be greater than the pressure desired at 34b, since the maximum pressure that can be obtained at 34b is that which prevails when the valve 50 is fully opened and the pressure above the diaphragm 44 approaches the ram pressure. Under these conditions the diaphragm 44 will hold the valve 37 open wide enough to maintain the pressure at 34b slightly below the pressure above the diaphragm 44.

As explained hereinbefore, so long as the upper end of the spring 63 remains stationary, a substantially constant pressure differential is maintained between the ambient pressure and the pressure beneath the diaphragm 55, regardless of fluctuations in the ram pressure at 34a. Since the products of combustion are discharged from the heater to ambient pressure, the maintenance of this constant pressure differential would also provide a constant air pressure differential across the combustion chamber. In order to maintain proper combustion, however, it is necessary to maintain a substantially constant ratio between the weight of air entering the combustion chamber per unit of time and the weight of fuel entering the combustion chamber per unit of time. With a liquid fuel entering the combustion chamber 15 at a constant volume rate, and with a constant air pressure differential across the combustion chamber, the weight of air entering the combustion chamber per unit of time would vary with changes in density caused by changes in altitude. Therefore, the regulator shown in Figure 4 includes means for increasing the force exerted by the spring 63 with increase in altitude, so as to increase the pressure differential across the diaphragm 55 with increase in altitude, and thus increase the volume of air entering the combustion chamber to compensate for its decrease in density. Said means comprises an aneroid which is generally indicated at 65 and whose vacuum chamber is indicated at 65I. The aneroid comprises a metal bellows 66 and a casing 67 around the bellows both mounted on a hub member 68 which is mounted on the neck 61 of the cover 60 for axial adjustment thereon. The top of the bellows is closed by a cupped member 69. A spring 70 tends to compress the bellows as the atmospheric pressure within the bellows decreases. The interior of the bellows is open to atmospheric pressure as indicated by the open ended passage 71. A push rod 72 is interposed between the bottom of the cupped member 69 and the top of the spring 63 so that as the cupped member 69 moves downwardly due to decrease of atmospheric pressure within the bellows, the compression of the spring 63 is correspondingly increased, thus increasing the spring pressure applied to the top of the diaphragm 55 as the ambient air pressure applied thereto decreases. The top of the spring 63 carries a cap 73 against which the lower end of the push rod 72 abuts. It will be understood that the rod is axially movable in the plug 62 through which it extends.

So long as the aircraft is in flight a substantial ram pressure will exist at 34a so as to permit the regulator 32 to function. From the foregoing description of the regulator 32 it will be seen that during flight of the aircraft at a fixed altitude the pressure of the air at the downstream side of the regulating valve 37 is maintained substantially constant regardless of variation in the speed of the aircraft. It will be seen also that if the upper end of the spring 63 were to remain stationary at increasing altitude, the ambient pressure would decrease with increasing altitude, but a constant differential would be maintained between the ambient pressure and the pressure beneath the diaphragm 55. Since the aneroid 65 increases the spring pressure on top of the diaphragm 55 as the ambient pressure decreases, the aneroid tends to open the valve 50 with decrease in ambient pressure. In thus tending to open the valve 50 with decrease in ambient pressure, the aneroid tends to prevent the pressure below the diaphragms 44 and 55 from following the decreasing ambient pressure and thus maintains an increasing pressure differential between the pressure beneath the diaphragms 44 and 55 and the ambient pressure with increasing altitude, so as to cause the volume of air entering the combustion chamber to increase in order to compensate for the decreasing density of the air with increasing altitude. In thus increasing the differential between the pressure at 34b and the ambient pressure, with increasing altitude, the presence of the aneroid 65 in the system causes the valve 37 to be farther open with increasing altitude than the valve would be if the aneroid were not present. The ram pressure is affected by altitude and therefore may be considered broadly as a portion of the altitude responsive system that includes the aneroid 65.

Since the pressure of the air at the downstream side of the regulating valve 37 is always less than the ram air pressure at 34a, the heater must be designed with combustion air passages large enough so that the maximum air pressure attainable at the downstream side of the valve 37 when the aircraft is at the maximum altitude at which the heater is designed to operate is still adequate to supply a sufficient amount of air for combustion. It is obvious also that the aneroid 65 should be designed so that the valve 50 is not held wide open until the aircraft reaches the maximum altitude at which the heater is designed to operate.

The particular air pressure which it is desired to maintain at the discharge side 34b of the main valve 37 will depend on the amount of air which will normally be required to support combustion of the fuel supplied to the combustion chamber 15 by the fuel supply means which includes the nozzle 24. Among the numerous advantages of the present invention the following are worthy of special note. By employing a combustion chamber which is circular in cross section and introducing the combustion air tangentially thereinto, the velocity of the incoming air may vary over a wide range without danger of blow-out of the combustion flame since a whirling flame tends to reignite itself. By initially contacting the air and fuel inside of rather than outside of the combustion chamber there is no explosion hazard due to premixed fuel and air outside of the combustion chamber. By relying on an air ram to provide a supply of combustion air under pressure and utilizing a pressure regulator to control the pressure of the air delivered to the combustion chamber, the necessity of a motor operated blower to provide such air and the controls therefor has been eliminated together with the maintenance troubles associated therewith.

What we claim is:

1. In an aircraft carried heating apparatus, means forming a combustion chamber having an air supply duct with its inlet leading from the exterior of the aircraft and directed toward the direction of aircraft travel and into the aircraft air stream, a valve controlling flow through said duct, means responsive to aircraft air speed, means operatively connecting said responsive means to said valve to move said valve toward closed position with increase in air speed, and barometric means operatively connected to said valve and tending to open said valve with increase in altitude and in opposition to said responsive means.

2. In a vehicle carried heating apparatus, means forming a combustion chamber having an air supply duct with its inlet directed toward the direction of vehicle travel and extending from the exterior of the vehicle, a valve controlling flow through said duct, means responsive to vehicle speed created air pressure in said duct, means operatively connecting said responsive means to said valve to move said valve toward closed position with increase in vehicle speed, and barometric means operatively connected to said valve and tending to open said valve with increase in altitude and in opposition to said responsive means.

3. In a vehicle carried heating apparatus, means forming a combustion chamber having an air supply duct with its inlet directed toward the direction of vehicle travel and extending from the exterior of the vehicle, a valve controlling flow through said duct, means responsive to vehicle speed created air pressure in said duct, means operatively connecting said responsive means to said valve to move said valve toward closed position with increase in vehicle speed, barometric means operatively connected to said valve and tending to open said valve with increase in altitude and in opposition to said responsive means, said combustion chamber being cylindrical and having in its side wall adjacent one end a tangential air inlet port to which said air supply duct delivers so that the air on entering said chamber tends to whirl therein, and means for supplying fluid fuel under pressure to said one end of said combustion chamber.

4. In an aircraft carried heating apparatus having a combustion chamber air supply duct leading to the exterior of and having its inlet directed upstream of the aircraft, a control device comprising an air flow regulating valve in the air supply duct, means responsive to aircraft speed created pressure changes in said duct on the outlet side of said valve and operatively connected to said valve to move said valve toward closed position with pressure increase, and means responsive to change in aircraft altitude and operatively connected to said valve and tending to move said valve toward open position with increase of altitude.

5. In an aircraft carried heating apparatus, means forming a combustion chamber having an outlet duct discharging exteriorly of the aircraft and having an atmospheric air inlet duct leading from the exterior of and directed upstream of the aircraft, means to supply fuel to said chamber, said inlet duct having means forming an air supply chamber from which air discharges into said combustion chamber, air flow regulating means in said duct anterior to said supply chamber, a casing having a pressure chamber, pressure sensitive means responsive to aircraft speed created air pressure in said pressure chamber, a conduit establishing communication between said pressure chamber and said supply chamber, means operatively connecting said regulating means to said sensitive means to reduce the air supply with increase in aircraft speed, means responsive to aircraft altitude, and means operatively connecting said altitude responsive means to said regulating means and tending to increase the air supply with increase in altitude in opposition to said sensitive means.

6. In an aircraft carried heating apparatus, means forming a combustion chamber, a casing having a pressure chamber, a pressure sensitive member responsive to aircraft speed created air pressure changes in said chamber, an air flow conduit extending from the exterior of and having its inlet directed upstream of the aircraft for supplying combustion air to the combustion chamber of the heating apparatus, a valve for controlling flow through said conduit, means operatively connecting said valve to said sensitive member to move said valve toward closed position upon increase of aircraft speed created air pressure in said pressure chamber, an air pressure transmitting duct connecting said pressure chamber to said conduit on the outlet side of said valve, and means responsive to altitude changes and operatively connected to said valve and tending to move said valve toward open position with increase in aircraft altitude.

7. Combustion apparatus adapted to be carried by an aircraft, comprising means forming a combustion chamber, a duct for introducing fuel into the combustion chamber, a duct for introducing air into the combustion chamber, adapted to be connected to an air ram, means forming a pressure chamber having a conduit adapted to be connected to an air ram and having a restricted outlet, a valve in said conduit for controlling the flow of air therethrough, means responsive to aircraft speed created pressure changes and operatively connected to said valve to move said valve toward closed position with pressure increase, means responsive to changes in aircraft altitude and operatively connected to said valve to move said valve toward open position with increase in altitude, means for regulating the volume rate of flow through said air duct, and means responsive to pressure changes in said pressure chamber relative to the pressure in said air duct and operatively connected to said regulating means to increase the volume rate of flow through said air duct with increase of said relative pressure in said pressure chamber.

References Cited in the file of this patent

UNITED STATES PATENTS

| Number | Name | Date |
|---|---|---|
| 1,562,663 | Strong | Nov. 24, 1925 |
| 1,644,496 | Scott | Oct. 4, 1927 |
| 1,777,524 | Kiefer | Oct. 7, 1930 |
| 2,097,255 | Saha | Oct. 26, 1937 |
| 2,314,089 | Hess et al. | Mar. 16, 1943 |
| 2,378,781 | McCollum | June 19, 1945 |
| 2,418,566 | Arnhym | Apr. 8, 1947 |
| 2,451,627 | McCollum | Oct. 19, 1948 |
| 2,452,779 | McCollum | Nov. 2, 1948 |
| 2,460,983 | Hess | Feb. 8, 1949 |
| 2,466,582 | Dillman | Apr. 5, 1949 |